Patented July 18, 1950

2,515,546

UNITED STATES PATENT OFFICE 2,515,546

COPPERABLE DISAZO DYESTUFFS

Werner Bossard, Riehen, near Basel, and Marcel Reding, Basel, Switzerland, assignors to J. R. Geigy A. G., Basel, Switzerland, a Swiss firm No Drawing. Application April 27, 1948, Serial No. 23,626. In Switzerland May 2, 1947

4 Claims. (Cl. 260—176)

The present invention is concerned with the manufacture of copperable disazo dyestuffs which give dyeings with excellent fastness properties on cellulose fibres.

The copperable polyazo dyestuffs have the advantages of very simple methods of manufacture, fastness to light which is often very good and of cheapness. These dyestuffs have greatly increased in importance because of wider applicability. This is especially true since the successful production of navy blue to black dyestuffs whose dyeings on cellulose show a fastness, even to repeated soap-washing, allowing them to compete for certain purposes with even the vat dyestuffs which, although somewhat superior, are expensive and difficult to dye.

The present invention is a valuable contribution to this group of copperable polyazo dyestuffs with outstanding fastness properties when wet, since it permits of the manufacture of yellow, copperable disazo dyestuffs whose after-coppered cellulose dyeings completely satisfy exacting requirements for wet-fastness properties after repeated soap-washing.

It has been found that by coupling an unsulfonated 4:4' - di - acetoacetylamino - diphenyl compound, which may also contain in 3:3'-position the usual simple substituents found in azo dyestuffs, such as alkyl and alkoxy groups or halogen atoms, on the one hand with one mol of an o-hydroxydiazo compound of the benzene series and on the other hand with one mol of a diazotised amine of the general formula

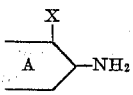

wherein

A means an aryl radical of the benzene series and
X means an OH or COOH group as metal-complex forming group there are obtained substantive disazo dyestuffs which give after-coppered dyeings on cellulose fibres having extraordinary fastness even after repeated soap-washing. It is advantageous to choose the components so that the disazo dyestuffs formed contain at least one sulfonic acid group, although the presence of two carboxyl groups is sufficient. The disazo dyestuffs of the invention are therefore characterised in that they contain, linked with the acetoacetyl radicals of the 4:4' - di - acetoacetylamino - diphenyl compounds, at least one o-hydroxyphenyl group, while the second arylazo group can also be a hydroxyphenylazo group, or an o-carboxy-phenylazo group.

The unsulfonated 4:4' - di - acetoacetylamino-diphenyl compounds used in the invention are obtained by methods known per se from unsulfonated 4:4' - diaminodiphenyl compounds usual in dye chemistry for making substantive azo dyestuffs (cf. Mayer, F., Chemie der organischen Farbstoffe, 3rd edn., Berlin, 1934, p. 54; Fierz-David, H. E., Künstliche Organische Farbstoffe, Berlin, 1926, p. 179; Ullmann, F., Enzyklopädie der technischen Chemie, 2nd edn., Berlin, vol. 2, 1926, p. 40) by reacting with acetoacetic acid esters or diketene. Particularly valuable disazo dyestuffs distinguished by good drawing power on cellulose fibres and outstanding fastness to washing are produced on using unsulfonated 4:4'-di-acetoacetyl-amino-diphenyl compounds substituted in the 3:3'-positions of the diphenyl radical. When the 3:3'-substituent is methyl or halogen, the dyestuffs generally yield coloristically interesting yellowish shades, while those with alkoxy groups in the 3:3'-positions give fine reddish yellow tones with extremely good fastness to washing, surpassing in this respect dyestuffs either unsubstituted or with other substituents in the diphenyl radical.

As already mentioned, the disazo dyestuffs according to the invention should contain at least one sulfonic acid group; more than two sulfonic acid groups in the dyestuff molecule, however, give products with distinctly poorer wet-fastness properties.

Especially valuable are dyestuffs with only one sulfonic acid group. Since the sulfonic acid radical can be present in only one of the two diazo components, this valuable group of the new, fast to washing, copperable dyestuffs is characterised in all cases by asymmetry with respect to the sulfonic acid grouping. Dyestuffs with o-aminophenol-monosulfonic acids, which may, like all the diazo components mentioned hereinafter, contain further substituents usual in azo dyestuffs, as first diazo component and unsulfonated anthranilic acids as the second, lead to yellow coppered cellulose dyeings, whereas with unsulfonated o-aminophenols the coppered dyeings are golden-yellow. Anthranilic monosulfonic acids as the first, and unsulfonated o-aminophenols as the second diazo component yield practically equivalent yellow, coppered cellulose dyeings. As particularly valuable diazo components there may further be mentioned: the 6-acylamino - 2- amino - 1 - hydroxybenzene - 4 - sulfonic acids, especially 6 - benzoylamino - 2 - amino-1-hydroxybenzene-4-sulfonic acid and also 6 - acetylamino - 2 - amino - 1 - hydroxybenzene-4-sulfonic acid and the 5-acylamino-2-aminobenzoic acids, especially 5-acetylamino- and 5-benzoylamino-2-aminobenzoic acid.

The majority of dyestuffs with two sulfonic acid groups in the molecule, which can be either symmetrical or unsymmetrical with respect to these radicals are not quite up to the standard of the first mentioned type. However, the 6 - benzoylamino - 2 - amino - 1 - hydroxybenzene - 4 - sulfonic acid cited above gives symmetrical disazo dyestuff-disulfonic acids which yield coppered cellulose dyeings with very good fastness prop-

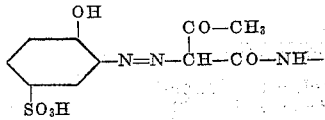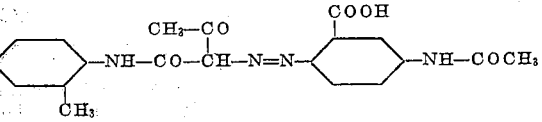

erties when wet. Nevertheless, more than two sulfonic acid groups in the dyestuff molecule have a damaging effect on fastness to water. The two carboxyl groups are also sufficient for a serviceable solubility in water.

The most valuable dyestuffs with regard to the wet-fastness properties of the after-coppered cellulose dyeings are, as can be seen from the above, the unsymmetrical disazo dyestuff-monosulfonic acids from 6-benzoylamino-2-amino-1-hydroxybenzene-4-sulfonic acid as first diazo component and unsulfonated o-aminophenols or unsulfonated anthranilic acids as second, the 5-acetylamino- and 5-benzoylamino-2-amino-benzoic acids being specially suitable. The important part played by 3:3'-dimethoxy or 3:3'-dichloro substitution in the diphenyl radicals has also been already mentioned.

The two diazo components can be coupled with the 4:4'di-acetoacetylamino-diphenyl compounds in any order but it is advisable on practical grounds to use a sulfonated diazo compound first.

The disazo dyestuffs of the invention can be coppered either in the dyebath or in a fresh bath with the usual copper salts such as, for example, copper sulfate or copper acetate, in a neutral or weakly acid medium. When necessary copper compounds stable to alkalies can be used, such as are obtained, for example, on treating copper sulfate with sodium tartrate in a bath made alkaline with soda. The after-treatment with copperising media changes the shade of the cellulose dyeings only slightly, but fastness to washing, light and alkalis is considerably improved.

added and a suspension of the diazonium compound from 19.4 parts of 5 - acetylamino - 2 - amino - benzene - 1 - carboxylic acid is allowed to flow in. The dyestuff formed, of the formula is precipitated out with common salt, filtered and dried. It is a yellowish-brown powder which dissolves in water and concentrated sulfuric acid to give a yellow solution. It gives after-coppered dyeings with cotton, staple fibre, viscose, hemp or jute in yellow tones with excellent fastness properties.

If, instead of the 38 parts of 4:4'-diacetoacetylamino-3:3'-dimethyl-1:1'-diphenyl in the above example there are used 33.2 parts of 4:4'-diacetoacetylamino-1:1'-diphenyl, 41.2 parts of 4:4' - diacetoacetylamino - 3:3' - dimethoxy - 1:1' - diphenyl or 42.1 parts of 4:4'-diacetoacetylamino-3:3'-dichloro-1:1'-diphenyl, then dyestuffs with similar properties are obtained.

*Example 2*

30.8 parts of 6-benzoylamino-2-amino-1-hydroxybenzene-4-sulfonic acid are dissolved together with 8 parts of soda in 250 parts of water. 6.9 parts of sodium nitrite are then mixed in and the whole added dropwise in the cold to 25 parts concentrated hydrochloric acid and 50 parts of water. The suspension of the diazonium compound so obtained is then mixed with a cold alkaline solution of 41.2 parts of 4:4'-diacetoacetylamino-3:3'-dimethoxy-1:1'-diphenyl in the presence of 20 parts of soda. The monoazo dyestuff forms rapidly. To it are added 20 parts of soda and the diazonium compound, prepared in the usual way, from 18.7 parts of 2-amino-1-hydroxybenzene-4-methylsulfone. After coupling is complete the disazo dyestuff produced, having the formula

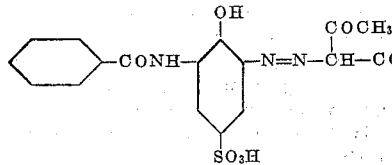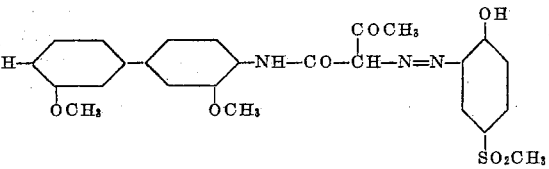

Yellow copperable disazo dyestuffs for cellulose fibres from one mol of a sulfo-anthranilic acid and one mol of an unsulfonated anthranilic acid as diazo components and 4:4'-di-aceto-acetylamino-3:3'-dimethyl-diphenyl as coupling component have already been described in the U. S. Patent No. 1,879,223. The disazo dyestuffs of the present invention are superior to these di-o-carboxyarylazo dyestuffs, particularly as regards wet-fastness properties, but also in fastness to alkalis, acids and to light.

The following examples serve to illustrate the invention, without limiting it however. Parts are given by weight and temperatures are in degrees Centigrade.

*Example 1*

18.9 parts of 2-amino-1-hydroxybenzene-4-sulfonic acid are diazotised in the usual way with 6.9 parts of sodium nitrite and added dropwise in the cold to a solution of 38 parts of 4:4'-diaceto-acetylamino-3:3'-dimethyl-1:1'-diphenyl in 400 parts of water, 10 parts of caustic soda lye and 20 parts of soda. After coupling is completed, 15 parts of soda in 80 parts of water are is separated out with common salt, filtered off and dried. It is a brown powder, dissolving in water and concentrated sulfuric acid to give a yellow solution and dyes after-coppered fibres of natural or regenerated cellulose in golden-yellow shades. The dyeings have excellent fastness properties.

Similar golden-yellow dyestuffs with equally good fastness properties are obtained if instead of 18.7 parts of 2-amino-1-hydroxybenzene-4-methylsulfone there are used 10.9 parts of 2-amino-1-hydroxybenzene, 12.3 parts of 4- or 5-methyl-2-amino-1-hydroxybenzene, 18.8 parts of 2-amino-1-hydroxybenzene-4-sulfonic acid amide, 20.2 parts of 2-amino-1-hydroxybenzene-4-sulfonic acid-monomethylamide, 21.6 parts of 2-amino - 1 - hydroxybenzene - 4 - sulfonic acid-dimethylamide, 14.35 parts of 4-chloro-2-amino-1-hydroxybenzene, 15.4 parts of 4-nitro-2-amino-1-hydroxybenzene, 19.9 parts of 2:4-dinitro-6-amino-1-hydroxybenzene, 15.3 parts of 2-amino-1-hydroxybenzene-4-carboxylic acid, 30.8 parts of 4-benzoyl-amino-2-amino-1-hydroxybenzene-6-sulfonic acid. The other preparative details are exactly as described in the above example.

Example 3

23.3 parts of 2-amino-1-hydroxybenzene-4-sulfonic acid-6-carboxylic acid are diazotised in the usual manner and the diazonium solution obtained is coupled at 0–5° with an alkaline solution of 42.1 parts of 4:4'-diacetoacetyl-amino-

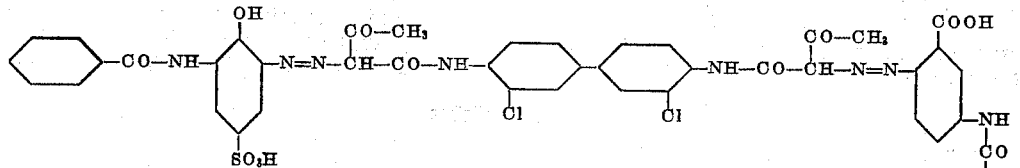

3:3'-dichloro-1:1'-diphenyl and 20 parts of soda. The monoazo dyestuff solution is then mixed with 20 parts of soda and the diazonium compound from 18.8 parts of 2-amino-1-hydroxybenzene-4-sulfonic acid amide. After a short time the disazo dyestuff of the formula

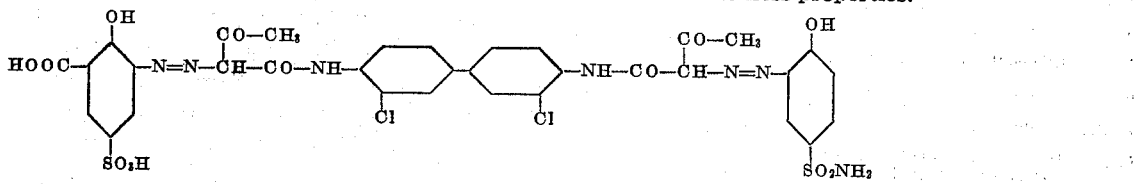

is formed and separated by adding common salt. When dried it is a brown powder giving a yellow solution in water and concentrated sulfuric acid. It produces fast, yellow after-coppered dyeings on cotton and staple fibre.

Similar yellow dyestuffs with similar properties are obtained if the 23.3 parts of 2-amino-1-hydroxybenzene -4- sulfonic acid - 6 - carboxylic acid of the above example are replaced by the same amount of 2-amino-1-hydroxybenzene-6-sulfonic acid-4-carboxylic acid, 18.9 parts of 2-amino-1-hydroxybenzene-4-sulfonic acid, 22.35 parts of 6-chloro-2-amino-1-hydroxybenzene-4-sulfonic acid, 20.3 parts of 4- or 6-methyl-2-amino-1-hydroxybenzene-6- or -4-sulfonic acid, 23.4 parts of 6-nitro-2-amino-1-hydroxybenzene-4-sulfonic acid, 24.6 parts of 6- or 4-acetylamino-2-amino-1-hydroxybenzene - 4 - or - 6 - sulfonic acid, 30.8 parts of 4-benzoylamino-2-amino-1-hydroxybenzene-6-sulfonic acid, 26.9 parts of 2-amino-1-hydroxybenzene-4:6-disulfonic acid or 21.7 parts of 2-aminobenzene-1-carboxylic acid-4- or -5-sulfonic acid.

On the other hand, if 41.2 parts of 4:4'-diacetoacetylamino-3:3'-dimethoxy-1:1' - diphenyl are used for the dyestuffs enumerated above instead of 42.1 parts of 4:4'-diacetoacetylamino-3:3'-dichloro-1:1'-diphenyl, then a somewhat more greenish yellow but with the same excellent fastness properties is obtained.

Example 4

30.8 parts of 6-benzoylamino-2-amino-1-hydroxybenzene-4-sulfonic acid are diazotised as described in Example 2 and coupled at 0–5° with an alkaline solution of 42.1 parts of 4:4'-diacetoacetylamino-3:3'-dichloro-1:1'-diphenyl and 20 parts of soda. To the solution of monoazo dyestuff are added 10 parts of sodium bicarbonate and the diazonium compound from 19.4 parts of 5-acetylamino-2-aminobenzene-1-carboxylic acid. The disazo dyestuff formed, having the formula

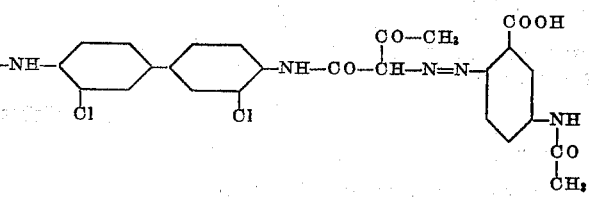

is precipitated out with common salt, filtered and dried. It is a yellowish brown powder whose solution in water and concentrated sulfuric acid is yellow in colour. The after-coppered yellow dyeings on cellulose fibres have excellent fastness properties.

Similar dyestuffs are obtained in the same way if, instead of 19.4 parts of 5-acetylamino-2-aminobenzene-1-carboxylic acid there are used 13.7 parts of 2-aminobenzene-1-carboxylic acid, 17.15 parts of 4- or 5-chloro-2-aminobenzene-1-carboxylic acid, 18.1 parts of 2-aminobenzene-1:4- or -1:5-dicarboxylic acid, 21.6 parts of 2-aminobenzene-1-carboxylic acid-5-sulfonic acid amide, 23.0 parts of 2-aminobenzene-1-carboxylic acid-5-sulfonic acid monomethylamide, 24.4 parts of 2-aminobenzene-1-carboxylic acid-5-sulfonic acid dimethylamide, 35.2 parts of 2-aminobenzene-1-carboxylic acid-5-sulfonic acid-phenylamide-4'-hydroxy-3'-carboxylic acid or 18.7 parts of 2-aminonaphthalene-3-carboxylic acid.

If in the above example the alkaline solution of 42.1 parts of 4:4'-diacetoacetylamino-3:3'-dichloro-1:1'-diphenyl is replaced by a similar solution of 41.2 parts of 4:4'-diacetoacetylamino-3:3'-dimethoxy-1:1'-diphenyl then somewhat more reddish dyestuffs having the same outstanding fastness properties are produced.

Example 5

61.6 parts of 6-benzoylamino-2-amino-1-hydroxybenzene-4-sulfonic acid are diazotised as described in Example 2. The suspension of the diazonium compound so obtained is neutralised with 9.5 parts of soda, and 10 parts of sodium bicarbonate are added. Next, an alkaline solution of 41.2 parts of 4:4'-diacetoacetylamino-3:3'-dimethoxy-1:1'-diphenyl is slowly dropped in during one hour. As soon as coupling is complete the diazo dyestuff produced, with the formula

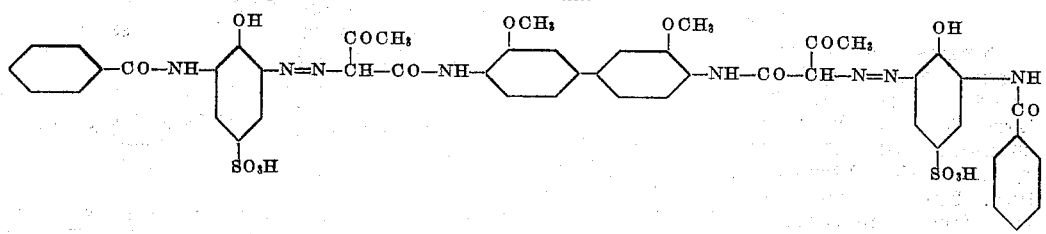

is precipitated out with common salt, filtered off and dried. It is a brown powder, which dissolves in water and concentrated sulfuric acid to give a yellow solution. It dyes after-coppered cotton or staple fibre in fast, golden yellow shades.

If the 61.6 parts of 6-benzoylamino-2-amino-1-hydroxybenzene-4-sulfonic acid in the above example are replaced by the same quantity of 4-benzoylamino-2-amino-1-hydroxybenzene-6-sulfonic acid, the procedure remaining otherwise the same, then a similar dyestuff with the same good fastness properties is obtained.

utes, subsequently rinsing and drying in the usual manner. The cotton is dyed in golden-yellow shades with outstanding fastness properties.

The following table lists further examples, serving to illustrate the present invention. The method of manufacture is the same in every case as described in the above examples. The first column contains the 4:4'-diacetoacetyl-aminodiphenyl compounds, while the two diazo components are given in the 2nd and 3rd columns.

*Table*

| No. | 4:4'-Diacetoacetyl-aminodiphenyl compound | o-Hydroxy-diazonium compound from— | Diazonium compound with o-group capable of forming a metal complex from— | Shade of the after coppered dyeing on cotton |
|---|---|---|---|---|
| 1 | 4:4'-diacetoacetyl-amino-3:3'-dimethoxy-1:1'-diphenyl. | 2-amino-1-hydroxy-benzene-4-sulfonic acid. | 2-amino-1-hydroxybenzene | golden-yellow. |
| 2 | ----do---- | ----do---- | 2-aminonaphthalene-3-carboxylic acid. | yellow. |
| 3 | ----do---- | 6-acetylamino,2-amino-1-hydroxybenzene-4-sulfonic acid. | 5-acetylamino-2-aminobenzene-1-carboxylic acid. | Do. |
| 4 | ----do---- | 2-amino-1-hydroxy-benzene-6-carboxylic acid-4-sulfonic acid. | 3:4:6-trichloro-2-amino-1-hydroxybenzene. | golden-yellow. |
| 5 | 4:4'-diacetoacetyl-amino-1:1'-diphenyl. | 6-benzoylamino-2-amino-1-hydroxybenzene-4-sulfonic acid. | 6-benzoylamino-2-amino-1-hydroxybenzene-4-sulfonic acid. | yellow. |
| 6 | ----do---- | ----do---- | 2-aminonaphthalene-3-carboxylic acid. | Do. |
| 7 | ----do---- | 2-amino-1-hydroxy-benzene-4-sulfonic acid. | 2-amino-1-hydroxybenzene-4-sulfonic acidamide. | Do. |
| 8 | 4:4'-diacetoacetyl-amino-3:3'-dichloro-1:1'-diphenyl. | ----do---- | 2-aminobenzene-1-carboxylic acid. | Do. |
| 9 | ----do---- | ----do---- | 2-amino-1-hydroxybenzene. | Do. |
| 10 | ----do---- | 6-acetylamino-2-amino-1-hydroxybenzene-4-sulfonic acid. | 2-aminobenzene-1-carboxylic acid-5-sulfonic acid-monomethyl-amide. | Do. |
| 11 | ----do---- | ----do---- | 2-amino-1-hydroxybenzene. | Do. |
| 12 | 4:4'-diacetoacetyl-amino-3:3'-dimethyl-1:1'-diphenyl. | 2-amino-1-hydroxy-benzene-4-sulfonic acid amide. | 2-aminobenzene-1 carboxylic acid-5-sulfonic acid. | Do. |
| 13 | ----do---- | 6-benzoylamino-2-amino-1-hydroxybenzene-4-sulfonic acid. | 2:4-dinitro-6-amino-1-hydroxy-benzene. | golden-yellow. |
| 14 | ----do---- | ----do---- | 4-benzoylamino-2-amino-1-hydroxybenzene-6-sulfonic acid. | yellow. |
| 15 | 4:4'-diacetoacetyl-amino-3:3'-dichloro-1:1'-diphenyl | 2-amino-1-hydroxy-benzene-4-sulfonic acid. | 2-aminonaphthalene-3-carboxylic acid. | Do. |
| 16 | 4:4'-diacetoacetyl-amino-3:3'-dimethoxy-1:1'-diphenyl. | 2-amino-1-hydroxy-benzene-6-carboxylic acid-4-sulfonic acid. | 2-aminonaphthalene-3-carboxylic acid. | Do. |
| 17 | ----do---- | 6-acetylamino-2-amino-1-hydroxybenzene-4-sulfonic acid. | 2-aminobenzene-1-carboxylic acid. | Do. |
| 18 | ----do---- | 2-amino-1-hydroxy-benzene-4-carboxylic acid-6-sulfonic acid. | 4-chloro-2-amino-1-hydroxybenzene. | golden yellow. |
| 19 | ----do---- | 2-amino-1-hydroxy-benzene-4-sulfonic acid. | 2-aminobenzene-1-carboxylic acid-5-sulfonic acid-dimethyl-amide. | yellow. |
| 20 | ----do---- | 2-amino-1-hydroxy-benzene-4-carboxylic acid. | 2-amino-1-hydroxybenzene 4-carboxylic acid. | golden-yellow. |
| 21 | ----do---- | ----do---- | 2-aminobenzene-1-carboxylic acid. | yellow. |
| 22 | ----do---- | 6-chloro-2-amino-1-hydroxybenzene-4-sulfonic acid. | 4-chloro-2-amino-1-hydroxybenzene. | golden-yellow. |
| 23 | ----do---- | 2-amino-1-hydroxybenzene-6-carboxylic acid-4-sulfonic acid. | 2-aminobenzene-1-carboxylic acid. | yellow. |
| 24 | 4:4'-diacetoacetyl-amino-3:3'-dichloro-1:1'-diphenyl. | 2-amino-1-hydroxybenzene-4-sulfonic acid. | 2-amino-1-hydroxybenzene-4-sulfonic acid amide. | Do. |
| 25 | 4:4'-diacetoacetyl-amino-1:1'-diphenyl. | 6-benzoylamino-2-amino-1-hydroxybenzene-4-sulfonic acid. | 2-amino-1-hydroxybenzene-4-sulfonic acid amide. | Do. |
| 26 | 4:4'-diacetoacetyl-amino-3:3'-dimethoxy-1:1'-diphenyl. | 2-amino-1-hydroxybenzene-4-carboxylic acid-6-sulfonic acid. | 2-aminonaphthalene-3-carboxylic acid. | Do. |
| 27 | ----do---- | 2-amino 1-hydroxybenzene-4-sulfonic acid. | 2-aminobenzene-1-carboxylic acid. | Do. |
| 28 | ----do---- | ----do---- | 2-aminobenzene-1-carboxylic acid-5-sulfonic acid amide. | Do. |
| 29 | ----do---- | 6-acetylamino-2-amino-1-hydroxy-benzene-4-sulfonic acid. | 2-amino-1-hydroxybenzene. | golden-yellow. |
| 30 | 4:4'-diacetoacetyl-amino-3:3'-dimethyl-1:1'-diphenyl. | 2-amino-1-hydroxybenzene-4-sulfonic acid. | 2-amino-1-hydroxybenzene. | yellow. |
| 31 | ----do---- | 6-benzoylamino-2-amino-1-hydroxybenzene-4-sulfonic acid. | 2-amino-1-hydroxybenzene-4-sulfonic acid amide. | Do. |
| 32 | ----do---- | ----do---- | 2-aminobenzene-1-carboxylic acid. | Do. |
| 33 | 4:4'-diacetoacetyl-amino-1:1'-diphenyl. | ----do---- | 5-acetylamino-2-aminobenzene-1-carboxylic acid. | Do. |
| 34 | 4:4'-diacetoacetyl-amino-3:3'-dimethoxy-1:1'-diphenyl. | 6-chloro-2-amino-1-hydroxybenzene-4-sulfonic acid. | 2-aminobenzene-1-carboxylic acid. | Do. |
| 35 | ----do---- | 2-amino-1-hydroxybenzene-4-sulfonic acid. | 5-benzoylamino-2-aminobenzene-1-carboxylic acid. | Do |
| 36 | 4:4'-diacetoacetyl-amino-3:3'-dichloro-1:1'-diphenyl. | ----do---- | 5-(4'-methyl-benzoylamino)-2-aminobenzene-1-carboxylic acid. | Do. |

*Example 6*

1.5 parts of the dyestuff obtained according to Example 2 are dissolved in 3000 parts of water and 2 parts of soda. 100 parts of cotton are entered at 40–50°, the bath raised to 90–95° within 30 minutes, 30 parts of sodium sulfate added and dyeing continued for 45 minutes at this temperature. The dyed goods are then rinsed cold and after-treated in a fresh bath with 2 parts of crystalline copper sulfate in 2000 parts of water and 2 parts of 30% acetic acid at 70° for 30 min-

What we claim is:

1. A copperable disazo dyestuff corresponding to the formula

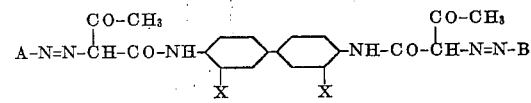

wherein X stands for a member selected from the group consisting of H, Cl, CH₃, and OCH₃, A stands for an aromatic radical of the benzene series which contains a sulfonic acid group and in o-position to the azo group a hydroxyl group,

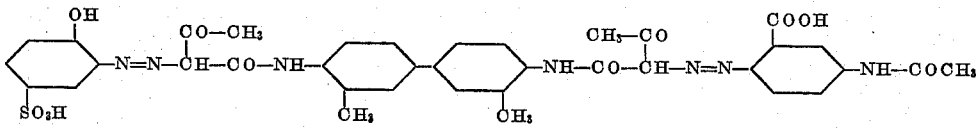

B stands for an aromatic radical of the benzene series which contains in o-position to the azo group a metal complex-forming group selected from the group consisting of OH and COOH.

2. A copperable disazo dyestuff corresponding to the formula

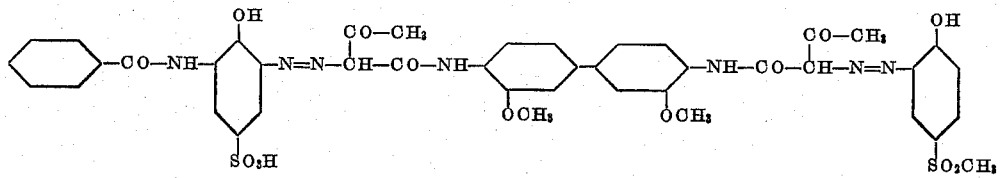

3. A copperable disazo dyestuff corresponding to the formula

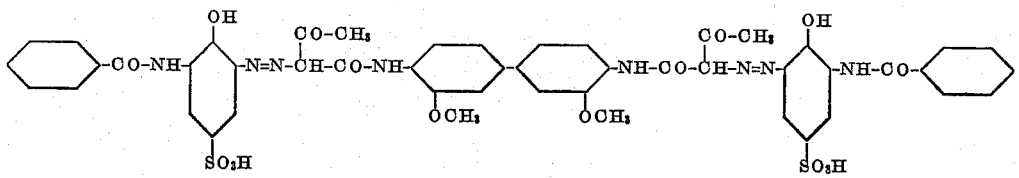

4. A copperable disazo dyestuff corresponding to the formula

WERNER BOSSARD.
MARCEL REDING.

REFERENCES CITED

The following references are of record in the file of this patent:

UNITED STATES PATENTS

| Number | Name | Date |
|---|---|---|
| 1,505,568 | Laska et al. | Aug. 19, 1924 |
| 1,879,223 | Hardtmann | Sept. 27, 1932 |
| 1,984,096 | Straub et al. | Dec. 11, 1934 |
| 2,120,814 | Rose | June 14, 1938 |
| 2,241,796 | Taube et al. | May 13, 1941 |
| 2,310,181 | Mackenzie | Feb. 2, 1943 |